A. LITTMAN & W. J. LACKIE.
FENDER.
APPLICATION FILED AUG. 18, 1909.
960,976. Patented June 7, 1910.
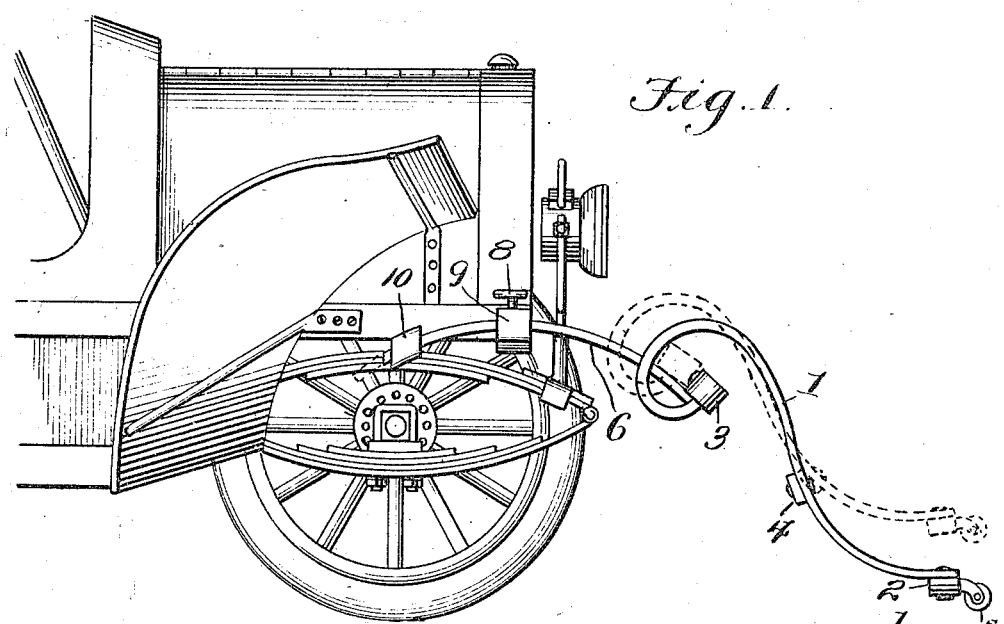
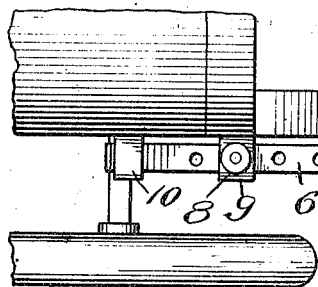
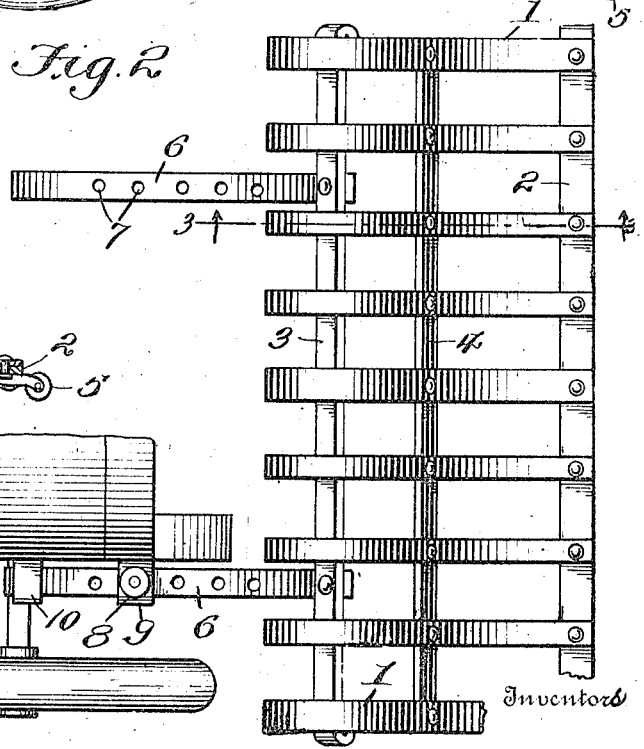
Witnesses
Inventors
Albert Littman, & William J. Lackie,
By Victor J. Evans,
Attorney.

UNITED STATES PATENT OFFICE.

ALBERT LITTMAN AND WILLIAM J. LACKIE, OF CLEVELAND, OHIO, ASSIGNORS OF ONE-THIRD TO NIELS T. MERCK, OF CLEVELAND, OHIO.

FENDER.

960,976.

Specification of Letters Patent.

Patented June 7, 1910.

Application filed August 18, 1909. Serial No. 513,489.

*To all whom it may concern:*

Be it known that we, ALBERT LITTMAN and WILLIAM J. LACKIE, citizens of the United States, residing at Cleveland, in the county of Cuyahoga and State of Ohio, have invented new and useful Improvements in Fenders, of which the following is a specification.

This invention relates to fenders for motor cars, automobiles and the like, the object of the invention being to provide a simple and practical fender adapted to be adjustably mounted at the front of the car, the adjustment providing for quickly raising and lowering the fender to accommodate the same to city or country travel, the fender itself being adapted to receive the impact of persons or objects and prevent the same from coming in contact with such portions of the motor car or automobile as would probably cause injury to such persons or objects.

To the above end the invention consists in the novel construction, combination and arrangement of parts as herein fully described, illustrated and claimed.

In the accompanying drawings:—Figure 1 is a side elevation of a forward portion of the motor car, showing the fender in its applied position and indicating by dotted lines the adjustment of the fender and the supporting means therefor. Fig. 2 is a plan view of the fender, showing also a portion of the machine. Fig. 3 is a vertical section through the fender, taken on the line 3—3 of Fig. 2.

The body of the fender is composed of a series of parallel spring slats or strips 1 bent into the shape of the letter S and having their forward extremities all secured to a common front connecting bar 2 while the rear extremities thereof are all secured to a common rear connecting bar 3. The said slats 1 may be further connected by one or more intermediate stringer bars 4 extending parallel to the bars 2 and 3. It will be observed that by reason of the way in which the slats 1 are bent they extend over in front of a cover and the rear connecting bar 3 so as to prevent persons or objects from coming in contact with said rear bar 3. The front bar 2 may be equipped with rollers 5 adapted to rest upon and roll in contact with the ground when the fender bears the weight of a person.

The fender, as a whole, is supported upon and connected with the car by means of a pair of curved or arcuate hangers 6 each of which is provided with a longitudinal series of holes 7 adapted to receive fasteners 8 in the form of pins inserted through holes in the top of an oppositely arranged pair of clips 9 secured to the frame of the car or automobile as shown in Figs. 1 and 3.

In the rear of the clips 9 other clips or guides 10 are secured to the machine, the rear guides 10 serving as braces for the hangers 6 and being arranged to permit the hangers 6 to be slid back and forth as indicated by full and dotted lines in Fig. 1. In this way, the rotation of the fender proper may be regulated to adapt the fender for city and country use, it being desirable to carry the fender in a comparatively elevated position while traveling along country roads while on the other hand it is desirable to have the fender located down low for city travel. The adjustment is effected in a very simple manner by raising the pins 8 and sliding the hangers 6 forward or backward until the desired adjustment of the fender is secured, whereupon the pins 8 are dropped into the appropriate holes 7 of the hangers.

The fender may be also quickly removed by the means described when not needed.

We claim:—

1. A fender for the purpose specified comprising a fender body, parallel arcuate hangers extending backward from the fender body, guides in which said hangers are received and adapted to slide in a curvilinear path, and means connected with said guides for fastening the hangers against sliding movement.

2. A fender for motor cars and like structures comprising a body composed of parallel spring slats, front and rear bars to which the extremities of said slats are connected, the rear portions of said slats curving over in front of the rear connecting bar and at a distance therefrom, a pair of arcuate hangers connected at their forward ends to the rear cross bar of the fender body and provided with a longitudinal series of holes, clips through which said hangers are adapted to slide in the direction of their length to vary the angle and elevation of the fender, and pins connected with said clips and insertible through the holes in the hanger bars to prevent the sliding movement thereof while permitting the fender to be adjusted, in the manner specified.

In testimony whereof we affix our signatures in presence of two witnesses.

ALBERT LITTMAN.
WILLIAM J. LACKIE.

Witnesses:
LOUIS CHESTLER,
DAVID LANGMAN.